(12) United States Patent
Choi et al.

(10) Patent No.: US 11,640,070 B2
(45) Date of Patent: May 2, 2023

(54) VIEWING-ANGLE LIGHT CONTROL FILM AND DISPLAY HAVING THE SAME

(71) Applicant: LG Display Co., Ltd., Seoul (KR)

(72) Inventors: Eunhee Choi, Paju-si (KR); JaeJung Han, Paju-si (KR); DaeYong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/330,104

(22) Filed: May 25, 2021

(65) Prior Publication Data

US 2022/0004017 A1 Jan. 6, 2022

(30) Foreign Application Priority Data

Jul. 3, 2020 (KR) .................. 10-2020-0081866

(51) Int. Cl.
*G02B 27/42* (2006.01)
*G06F 3/041* (2006.01)

(52) U.S. Cl.
CPC ....... *G02B 27/4233* (2013.01); *G06F 3/0412* (2013.01)

(58) Field of Classification Search
CPC .................. G02B 27/4233; G06F 3/0412
See application file for complete search history.

(56) References Cited

U.S. PATENT DOCUMENTS

| | | | |
|---|---|---|---|
| 2017/0168607 A1* | 6/2017 | Cao .................. | G06F 3/0418 |
| 2019/0131350 A1* | 5/2019 | Kwak ................ | H01L 27/3211 |
| 2020/0144550 A1* | 5/2020 | Lee ................... | H01L 51/5281 |
| 2021/0210557 A1* | 7/2021 | Lim ................... | H01L 27/323 |

FOREIGN PATENT DOCUMENTS

| | | |
|---|---|---|
| KR | 10-2019-0070466 A | 6/2019 |
| KR | 10-2019-0074874 A | 6/2019 |

* cited by examiner

*Primary Examiner* — Peter D McLoone
(74) *Attorney, Agent, or Firm* — Birch, Stewart, Kolasch & Birch, LLP

(57) ABSTRACT

A viewing angle light control film and a display having the same are discussed. The viewing angle light control film according to the present disclosure can include a base film, a first optical layer disposed on the base film, a second optical layer contacting the first optical layer, and a light scattering pattern disposed at an interface between the first optical layer and the second optical layer.

15 Claims, 9 Drawing Sheets

VIEWING-ANGLE LIGHT CONTROL FILM AND DISPLAY HAVING THE SAME

CROSS-REFERENCE TO RELATED APPLICATIONS

This application claims the priority benefit of the Korean Patent Application No. 10-2020-0081866 filed on Jul. 3, 2020 in the Republic of Korea, the entire contents of which are hereby expressly incorporated by reference as if fully set forth herein into the present application.

BACKGROUND

Field of the Invention

The present disclosure relates to a viewing angle light control film and a display having the same. Particularly, the present disclosure relates to an optical film maintaining the optical homogeneity between areas with different viewing angles at a front direction and to a display having the optical film.

Discussion of the Related Art

Devices or apparatuses for displaying images have been developed in various forms such as CRT (Cathode Ray Tube), LCD (Liquid Crystal Display), PDP (Plasma Display Panel), and electroluminescent display. In particular, the electroluminescent display can include a self-luminous display or a curved self-luminous display. For example, the display can include a light emitting display panel, a micro LED (light emitting diode) display panel, a flexible light emitting display panel, a flexible micro LED display panel, or a quantum dot light emitting display panel, but it is not limited thereto. These various types of display apparatus are used to display image data from various products such as computers, mobile phones, automated teller machines (ATM) and/or vehicle navigation systems according to their respective characteristics.

Display apparatuses mainly used in the terminal devices such as mobile phones and computer monitors generally include flat display panels having a wide viewing angle close to 180 degrees when viewed from the front direction. The flat display panel can be formed with a thin thickness, and can be implemented with a film material having excellent flexibility. As a display apparatus having a flat display panel is applied to various applicable devices, it is being developed to have a variety of structure to have a shape and function suitable for the usage environment.

For an example, when it is not used, the display apparatus can be rolled up and stored, and then it can be implemented to be expanded to use. For another example, it can be implemented to fold for a small sized display area and use it to open it for a large sized display area. For still another example, a partial area of the display area can be bent in a 'J' shape to divide the display area into a main screen and a sub screen to display the images.

When the display panel is bent or folded, there can be divided areas with different viewing angles as looking at the front direction. In this case, a difference in color gamut, hue and/or luminance may occur due to a difference in the viewing direction (or viewing angle), or the color inversion can occur in severe cases. These limitations can degrade the quality of the display apparatus, and can distort the image information which may cause the limitations in provision of the image information correctly.

SUMMARY

One purpose of the present disclosure, as for addressing the limitations described above, is to provide a viewing angle light control film and a display having the same, which improves an optical distortion limitation which can occur between regions depending on different front viewing angles.

Another purpose of the present disclosure is to provide a viewing angle light control film that gently adjust the distribution of variations between the luminance of the light provided in the front viewing angle direction and the luminance of the light provided in the side viewing angle direction, and a display having the same.

Still another purpose of the present disclosure is to provide a viewing angle light control film suggesting a similar level of color gamut and luminance in all directions by reducing the differences between the luminance in the front viewing angle direction and the luminance in the side viewing angle direction, and a display having the same.

In order to accomplish the above-mentioned purposes of the present disclosure, a viewing angle light control film according to the present disclosure comprises a base film; a first optical layer disposed on the base film; a second optical layer contacting the first optical layer; and a light scattering pattern disposed at an interface between the first optical layer and the second optical layer.

In one example, the first optical layer has a plurality of pillars, each pillar having a first width and a first height, and the pillars are arrayed with an arrangement interval corresponding to the first width. The light scattering layer is formed on sidewalls of the pillars. The second optical layer is filled in the arrangement interval between the pillars of the first optical layer.

In one example, the light control film further comprises a third optical layer covering the pillar of the first optical layer and having a second width wider than the first width. The light scattering pattern includes: a first embossing pattern formed at the sidewall of the pillar; and a second embossing pattern formed at sidewalls of the third optical layer.

In one example, the light scattering layer has a slanted angle in range between 75° and 89° with respect to a plane surface of the base film.

In one example, the light scattering pattern includes a lens pattern formed between the first optical layer and the second optical layer.

In one example, the lens pattern has a concaved lens pattern recessed toward the base film.

In one example, the lens pattern has a convexed lens pattern uprised (e.g., raised or protruding) from the base film. A middle area of the convexed lens pattern has a flat plane surface. A prism pattern is disposed on the flat plane surface.

In one example, the first optical layer and the second optical layer have a refractive index difference of 0.10, at least.

In one example, the base film and the first optical layer have a first refractive index in range between 1.40 and 1.50. The second optical layer has a second refractive index in range between 1.51 and 1.65.

Further, a display apparatus according to the present disclosure comprises a display panel; and a viewing angle light control film including: a base film; a first optical layer disposed on the base film; a second optical layer contacting the first optical layer; and a light scattering pattern disposed at an interface between the first optical layer and the second optical layer.

Further, a display apparatus according to the present disclosure comprises a display panel including: a first display area having a first front viewing direction; and a second display area being continuous from the first display area and having a second front viewing direction different from the first front viewing direction; and a viewing angle light control film disposed at a front face of the display panel and including: a base film having a first area corresponding to the first display area, and a second area corresponding to the second display area; a first optical layer disposed on the base film; a second optical layer contacting the first optical layer; and a light scattering pattern disposed at an interface between the first optical layer and the second optical layer.

In one example, the display panel and the viewing angel light control film are disposed on a plane including a first axis and a second axis perpendicular to the first axis. The light scattering pattern includes a pattern length extended along to the first axis. The light scattering pattern arrayed along the second axis with an arrangement interval.

In one example, the light scattering pattern is disposed as having maximum distribution density at a boundary between the first area and the second area. The light scattering pattern, in the first area and the second area, is disposed as a distribution density is gradually decreased as being apart from the boundary.

In one example, the light scattering pattern is arrayed continuously along the first axis at the boundary. The light scattering pattern has a structure in which a plurality segments are arrayed along the first axis in the first area and the second area, each of the segment having the pattern length and arrayed with a pattern gap.

In one example, the distribution density of the segments is getting higher as the pattern gap is getting shorter than the pattern length of the segment. The distribution density of the segments is getting lower as the pattern gap is getting longer than the pattern length of the segment.

In one example, the display apparatus further comprises an optical film disposed on the display panel; a touch layer disposed on the optical film; and a cover plate disposed on the touch layer. The display panel includes an emission layer and an encapsulation layer covering the emission layer.

In one example, the viewing angle light control film is disposed any one of between the encapsulation layer and the optical film and between the optical film and the touch layer.

In one example, the touch layer includes: the viewing angle light control film; a touch electrode layer disposed on any one of a top surface and a bottom surface of the viewing light control film; and an overcoating layer covering the touch electrode layer.

A viewing angle light control film according to the present disclosure can be disposed at a front surface of the display panel, so that the light distortion that can be occurred due to a sudden change in the viewing direction can be prevented even when the display panel is bent or folded. As a result, it can provide a correct image that is not distorted even when viewed from any viewing direction in the flat panel display apparatus and/or in the flexible display apparatus.

In addition, the viewing angle light control film according to the present disclosure can be disposed in front of a display panel having two regions of which front viewing angles are different, so that the light distortion due to the difference in front viewing directions can be prevented or minimized. Furthermore, by disposing the light scattering pattern provided in the viewing angle light control film with a high density in the curved or bent region in which the front viewing direction is changed, the difference in luminance and color as a whole may not occur rapidly. Accordingly, even in a display apparatus having various bent structures, it can provide the high-quality display information in which luminance and color gamut may not be changed rapidly.

In addition to the effects of the present disclosure mentioned above, other features and advantages of the present disclosure can be described below, or can be clearly understood by those skilled persons in this art from such below descriptions and explanations.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
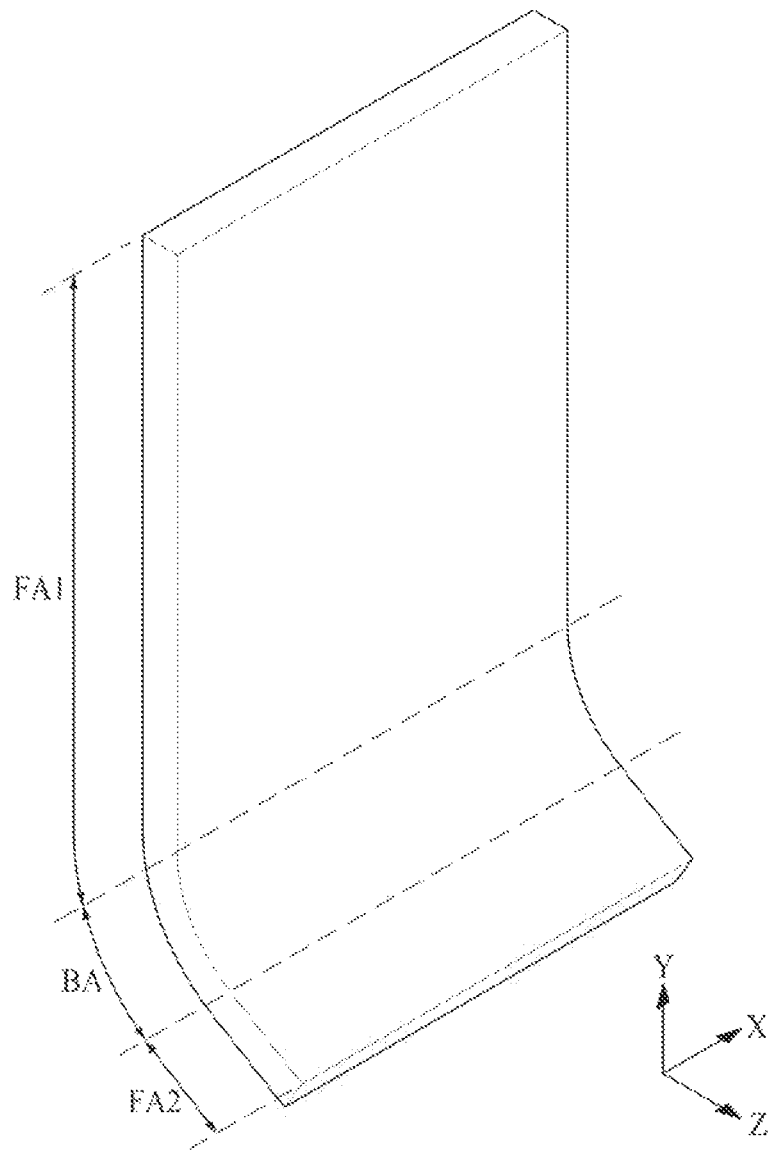
FIG. 1 is a perspective view illustrating a structure of a display apparatus having a viewing angle light control film according to one or more embodiments of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions may be omitted or may be brief. The terms described in the specification should be understood as follows. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important points of the present disclosure, the detailed description may be omitted or may be brief.

In the case that "comprise," "have," and "include" described in the present specification are used, another part can also be present unless "only" is used. The terms in a singular form can include plural forms unless noted to the contrary.

In construing an element, the element is construed as including an error range although there is no explicit description.

In describing a positional relationship, for example, when the positional order is described as "on," "above," "below," and "next," the case of no contact there-between can be included, unless "just" or "direct" is used. If it is mentioned that a first element is positioned "on" a second element, it does not mean that the first element is essentially positioned above the second element in the figure. The upper part and the lower part of an object concerned can be changed depending on the orientation of the object. Consequently, the case in which a first element is positioned "on" a second element includes the case in which the first element is positioned "below" the second element as well as the case in which the first element is positioned "above" the second element in the figure or in an actual configuration.

In describing a temporal relationship, for example, when the temporal order is described as "after," "subsequent," "next," and "before," a case which is not continuous can be included, unless "just" or "direct" is used.

It will be understood that, although the terms "first," "second," etc. can be used herein to describe various elements, these elements should not be limited by these terms. These terms are only used to distinguish one element from another and may not define order. For example, a first element could be termed a second element, and, similarly, a second element could be termed a first element, without departing from the scope of the present disclosure.

In describing the elements of the present disclosure, terms such as the first, the second, A, B, (a) and (b) can be used. These terms are only to distinguish the elements from other elements, and the terms are not limited in nature, order, sequence or number of the elements. When an element is described as being "linked", "coupled" or "connected" to another element that element can be directly connected to or connected to that other element, but indirectly unless otherwise specified. It is to be understood that other elements can be "interposed" between each element that can be connected to or coupled to.

It should be understood that the term "at least one" includes all combinations related with any one item. For example, "at least one among a first element, a second element and a third element" can include all combinations of two or more elements selected from the first, second and third elements as well as each element of the first, second and third elements.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in a co-dependent relationship.

Hereinafter, an example of a display apparatus according to the present disclosure will be described in detail with reference to the accompanying drawings. In designating reference numerals to elements of each drawing, the same components can have the same reference numerals as much as possible even though they are shown in different drawings. Scale of the elements shown in the accompanying drawings can have a different scale from the actual for convenience of description, and it is not limited to the scale shown in the drawings.

Figure 2A:
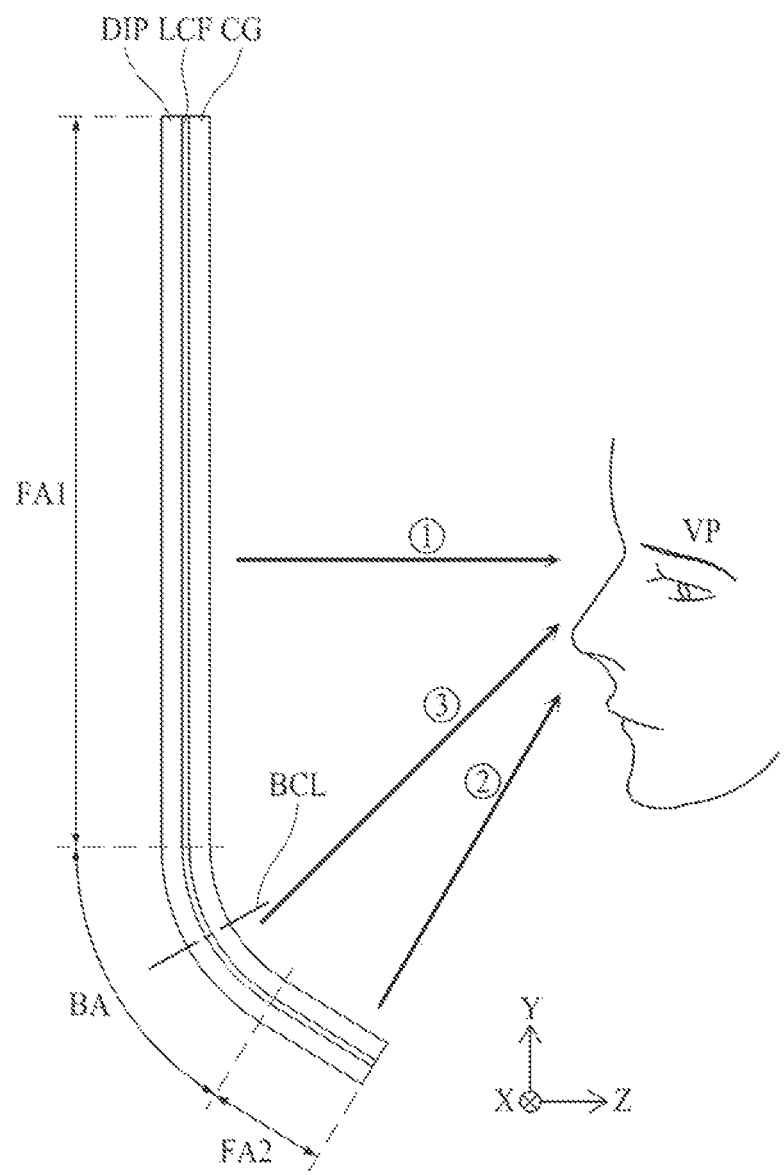
FIG. 2A is a side view illustrating the display apparatus according to the present disclosure shown in FIG. 1.
Figure 2B:
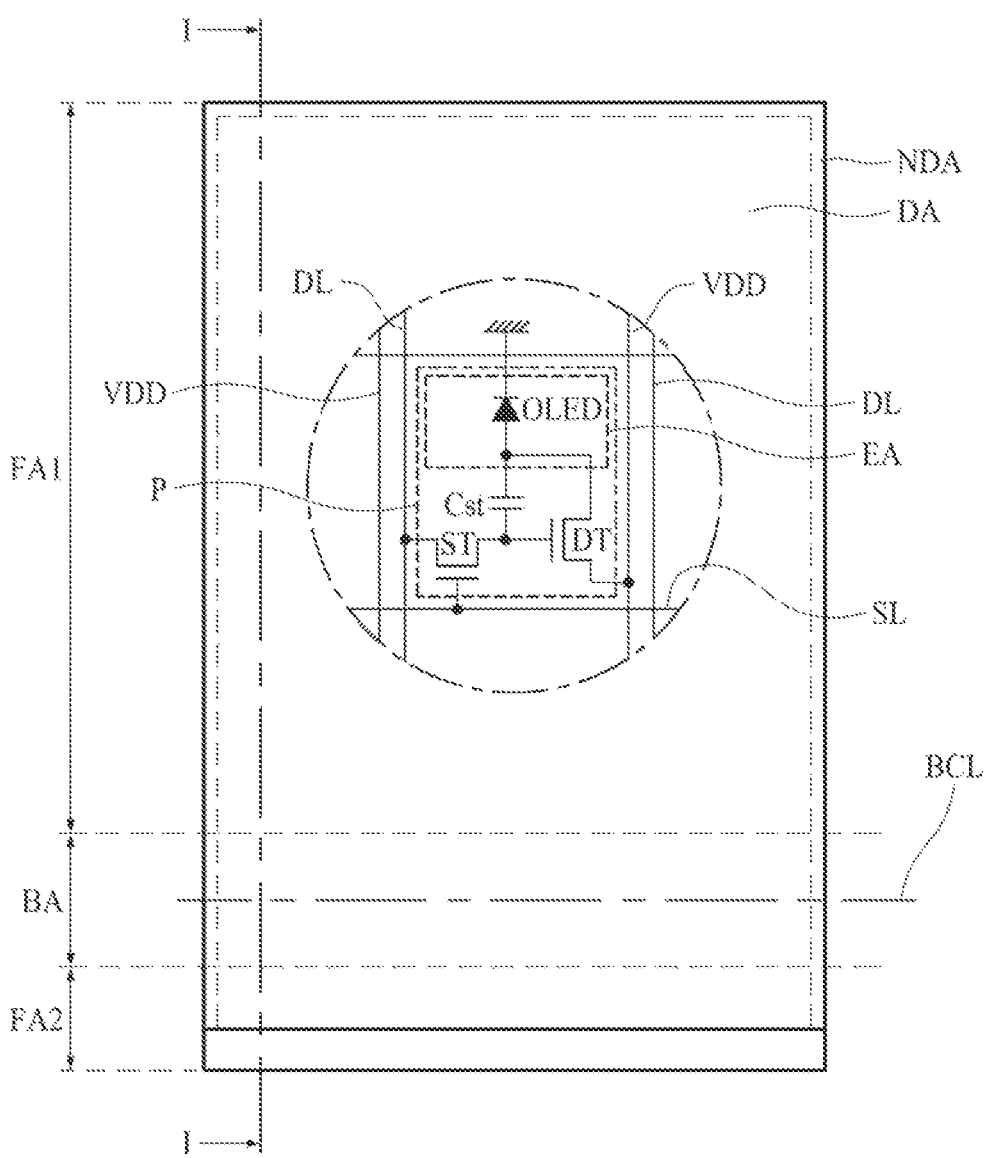
FIG. 2B is a front view illustrating the display apparatus according to the present disclosure shown in FIG. 1.

Hereinafter, referring to FIGS. 1, 2A and 2B, a display apparatus having a viewing angle light control film according to the present disclosure will be explained. FIG. 1 is a perspective view illustrating a structure of a display apparatus having a viewing angle light control film according to the present disclosure. FIG. 2A is a side view illustrating the display apparatus according to the present disclosure shown in FIG. 1. FIG. 2B is a front view illustrating the display apparatus according to the present disclosure shown in FIG. 1.

Referring to FIG. 1, the display apparatus having the viewing angle light control film according to the present disclosure can have a 'J' shape in which some portion(s) of the lower part are bent at a certain angle in the front direction. For example, the display apparatus according to the present disclosure can include a first flat area FA1, a bending area BA and a second flat area FA2. When referring to the coordinate system shown in FIG. 1, the first flat area FA1 can be disposed on the XY plane. The bending area BA can be extended from one short end side of the first flat area FA1 and be bent at an angle in the +Z direction to have a curved surface. The second flat area FA2 can be a plane which continues for a predetermined distance in the tangent direction of the curved surface from one short end side of the bending area BA. The second flat area FA2 can have a structure of a plane inclined at a certain angle in the +Z direction from the XY plane. Here, the bent degree of the bending area BA with respect to the first flat area FA1 can have an angle appropriately selected for an application product having the display apparatus. It is preferable that the bent degree can be less than 90°.

The bending area BA shown in FIG. 1 can have a wide width and be bent with gentle curvature. For example, the bending area BA can have a partial shape of a cylinder having a predetermined radius around the bending central axis. The bent shape shown in FIG. 1 can be one example, but not limited thereto. For another example, the bending area BA can have a structure that is rapidly bent at the bending central line BCL and folded.

The first flat area FA1 can be defined as a first display area having a first front viewing direction (or first front viewing angle). The second flat area FA2 can be defined as a second display area having a second front viewing direction (or second front viewing angle) different from the first front viewing direction. Further, the bending area BA can be defined as a third display area having a third front viewing direction (or third front viewing angle) different from the first and second front viewing directions. When the bending area BA can be formed as having very narrow curved area such as the folded structure, the display apparatus can comprise only the first flat area FA1 and the second flat area FA2.

Referring to FIGS. 2A and 2B, the display apparatus according to the present disclosure can comprise a display panel DIP, a viewing angle light control film LCF and a cover plate CG, in the side view. The viewing angle light control film LCF can be attached on the front surface of the display panel DIP. In other words, the viewing angle light control film LCF can be attached on the surface of the display panel DIP on which the image information is provided. The display panel DIP can include a first flat area FA1 having a first front viewing direction ① and a second flat area FA2 having a second front viewing direction ②. Further, the display panel DIP can include a bending area BA having a third front viewing direction ③.

The display panel DIP can include only a first flat area FA1 and a bending area BA excluding the second flat area FA2. In this case, the bending area BA can be defined as a second display area having a second front viewing direction.

The display panel DIP can be any one selected display panel of a liquid crystal display panel, a plasma display panel, and an electroluminescent display panel. For the case that the electroluminescent display panel is used, the display panel DIP can include a self-luminescent display panel or a curved self-luminescent display panel. In detail, the display panel DIP can include a light emitting display panel, a micro light emitting display panel, a flexible light emitting display panel, a flexible micro light emitting display panel, or a quantum dot display panel.

The display panel DIP can further include a display layer and an encapsulation layer covering the display layer.

The display panel DIP can include a transparent substrate. The display layer can include a plurality of pixels (or pixel areas) disposed in a matrix manner. Each pixel area P can include a driving element and a light emitting element. The driving element can include thin film transistors and a storage capacitor. The light emitting element can be an electroluminescent element of which luminescent can be controlled by the driving element. The electroluminescent element can include an organic light emitting diode or an inorganic light emitting diode.

The encapsulation layer can be protecting the display layer and prevents gases or foreign materials from intruding from the outside. The encapsulation layer can have a structure in which an inorganic layer and an organic layer are alternately stacked. It is preferable that the encapsulation layer is formed of a transparent material.

Hereinafter, referring to FIG. 2B, a plane structure of the display panel DIP will be explained. Referring to FIG. 2B, the display panel DIP can be divided into a display area DA and a non-display area NDA. The display area DA, the area for representing video images, can be defined in most of the middle portions of the display panel DIP, but not limited thereto. The display area DA can include a plurality of pixel areas P arrayed in a matrix manner.

For the case of display panel DIP for the organic light emitting diode display, each of the pixel areas P can have a polygonal shape surrounded by scan lines (or gate lines) SL, data lines DL, and driving current lines VDD. Each of the pixel areas P can include a switching thin film transistor ST, a driving thin film transistor DT, a storage capacitor and an organic light emitting diode OLED.

The display panel DIP can include a plurality of pixels P arranged in a matrix manner. Each of the pixels P can have one emission area EA. The area other than the emission area EA in a pixel P can include a switching thin film transistor ST, a driving thin film transistor DT, a storage capacitor Cst, a scan line SL, a data line DL and a driving current line VDD. For example, the emission area DA can include the organic light emitting diode OLED electrically connected to the driving thin film transistor DT can be disposed.

An emission area EA can represent one color light. For an example, any one-color light of red, green and blue can be generated from one emission area EA. Three of pixels P, each pixel having an emission area EA representing one-color light and a transmission area TA, can be gathered or grouped to form one of unit pixel. As another example, an emission area EA can include any one-color light selected from red, green, blue and white color lights. In this case, four pixels P representing 4 different color light in each pixel can be grouped to form one of unit pixel.

As a variation, one or each pixel P having an emission area EA allocated with one color can be defined as a sub pixel. In FIG. 2B, one pixel P can be one sub pixel, and a plurality of sub pixel can be arrayed in a matrix manner.

A black matrix can be disposed between two neighboring pixels P. The black matrix can be disposed as covering the areas of pixel P excepting the emission area EA. For an example, the black matrix can be disposed as overlapping the switching thin film transistor ST, the driving thin film transistor DT, the storage capacitor Cst, the scan line SL, the data line DL and the driving current line VDD. For another example, the switching thin film transistor ST, the driving thin film transistor DT and the storage capacitor Cst can be disposed as overlapping with the emission area EA.

The non-display area NDA, where the video image is not provided, can be defined at the circumference area of the display panel DIP as surrounding whole or some of the display area DA. The non-display area NDA can include gate drivers and data pad portions. Since the gate driver, the data pad portion and other driving components can be the same as those of the related display apparatus, the detailed descriptions will not be duplicated. Hereinafter, a viewing angle light control film LCF according to various embodiments of the present disclosure will be described.

First Embodiment

Figure 3A:
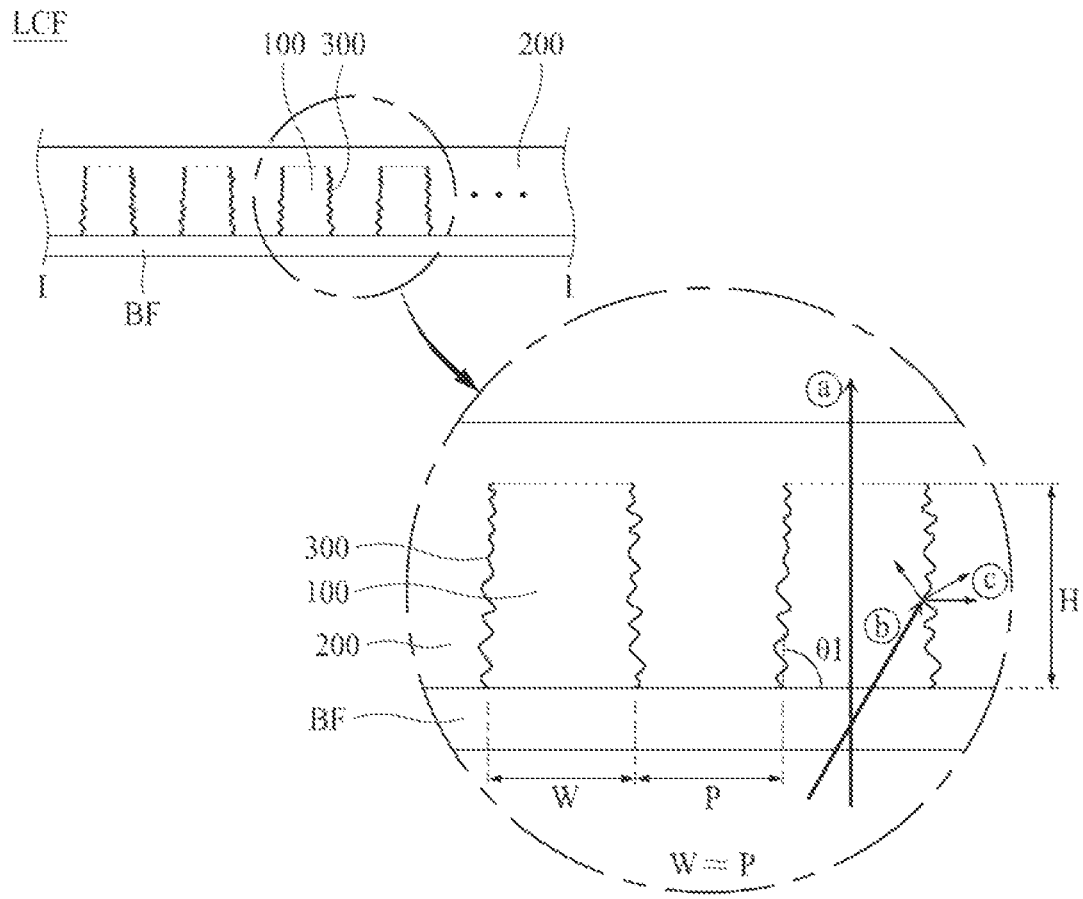
FIG. 3A is a cross-sectional view illustrating a structure of a viewing angle light control film according to a first embodiment of the present disclosure.

Hereinafter, referring to FIGS. 3A and 3B, a viewing angle light control film according to the first embodiment will be explained. FIG. 3A is a cross-sectional view illustrating a structure of a viewing angle light control film according to the first embodiment of the present disclosure.

Referring to FIG. 3A, the viewing angle light control film LCF according to the first embodiment can include a base film BF, a first optical layer 100, a second optical layer 200 and an embossing pattern (or ragged pattern) 300. The base film BF, the first optical layer 100 and the second optical layer 200 can be formed of a transparent organic material. The embossing pattern 300 can be an irregular light scattering pattern formed at an interface between the first optical layer 100 and the second optical layer 200.

The base film BF can be a film having a thin and constant thickness formed of a soft rubber material (EPU: elastic Poly Urethane) or a thermoplastic elastomer material (TPU: Thermoplastic Polyurethane). The base film BF can be made of a transparent material having the refractive index in range of 1.40 to 1.50.

The first optical layer 100 can include a transparent organic material. The first optical layer 100, for forming the embossing pattern 300, can include a first optical material having a first refractive index equal to or slightly larger than the refractive index of the base film BF. The embossing pattern 300 can be formed at the surface of the first optical layer 100. The second optical layer 200 can include a second optical material having a second refractive index larger than the refractive index of the base film BF, for filling the space between neighboring two of first optical layer 100 and covering the embossing pattern 300.

For example, the first optical material can be deposited on the base film BF, and then formed to have a structure in which a plurality of pillars (or columns) having a height H and a width W are disposed with a predetermined interval (or an arrangement interval) P. After that, by etching the side walls of the pillars, the embossing pattern 300. By depositing the second optical material over the first optical layer 100, the second optical layer 200 can be formed as perfectly covering and burying the first optical layer 100 and embossing pattern 300. The thickness of the second optical layer 200 can be larger than the height H of first optical layer 100 so that the top surface of the second optical layer 200 can have a flat plane surface.

It is preferable that the first optical layer 100 and the second optical layer 200 can be formed of optical materials having different refractive indices from each other. The embossing pattern 300 can form an interface between the first optical layer 100 and the second optical layer 200. When the first optical layer 100 and second optical layer 200 have the same refractive index, it can be difficult to ensure an appropriate function of the embossing pattern 300. Since the embossing pattern 300 is for scattering light passing through it, it is preferable that the first optical layer 100 can have the different refractive index from the second optical layer 200 to increase the scattering efficiency of the light. Even though the refractive indices of the first optical layer 100 and second optical layer 200 are same, the scattering effect can be obtained by the shape of the embossing pattern 300 or by air bubbles interposed between the bumps of the embossing pattern 300. However, the difference between the refractive indices can be more effective to implement the scattering effect and function.

For example, the first optical layer 100 can have a refractive index in a range between 1.40 and 1.50. Further, the second optical layer 200 can have a refractive index in a range between 1.51 and 1.65. It is preferable that the difference between the refractive index of the first optical layer 100 and the refractive index of second optical layer 200 can be at least 0.10. In this embodiment, the refractive index of the second optical layer 200 is larger than that of the first optical layer 100, but it is not limited thereto. In some cases, the first optical layer 100 can have a larger refractive index than the second optical layer 200.

It is preferable that the width W and the arrangement interval P of the pillar bodies forming the first optical layer 100 can be substantially the same. At a result, a plurality of the embossing patterns 300 can be arranged at a regular arrangement interval P.

The pillar body of the first optical layer 100 can have a vertical side wall. However, as considering the manufacturing process or method, the pillar body can have the sidewalls with a slope range of less than 1.5 degree from the vertical line. For example, the embossing pattern 300 defined by the sidewall of the first optical layer 100 can have a first slanted angle $\theta 1$ in range between 88.5° and 90° with respect to the plane surface of the base film BF.

In this case, the light incident perpendicularly to the plane surface of the base film BF under outside of the base film BF can transmit the first optical layer 100 and the second optical layer 200, and then pass through the viewing angle light control film LCF. Therefore, for light path of the vertically incident light (a), a slight decrease in luminance due to the light transmittance of the viewing angle light control film LCF can occur, without any significant change. On the contrary, when the light incident obliquely to the plane surface of the base film BF under outside of the base film BF as the slanted incident light (b), the light can strike the embossing pattern 300 disposed between the first optical layer 100 and the second optical layer 200. As a result, the light can be scattered by the embossing pattern 300 as the scattered light path (c), and pass through the viewing angle light control film LCF. Therefore, the light traveling in the direction of the viewing angle can be diffused or scattered in the direction of the wider viewing angle. Here, the 'viewing angle' can be defined the angle from the vertical (or normal) direction of the base film BF.

Figure 3B:
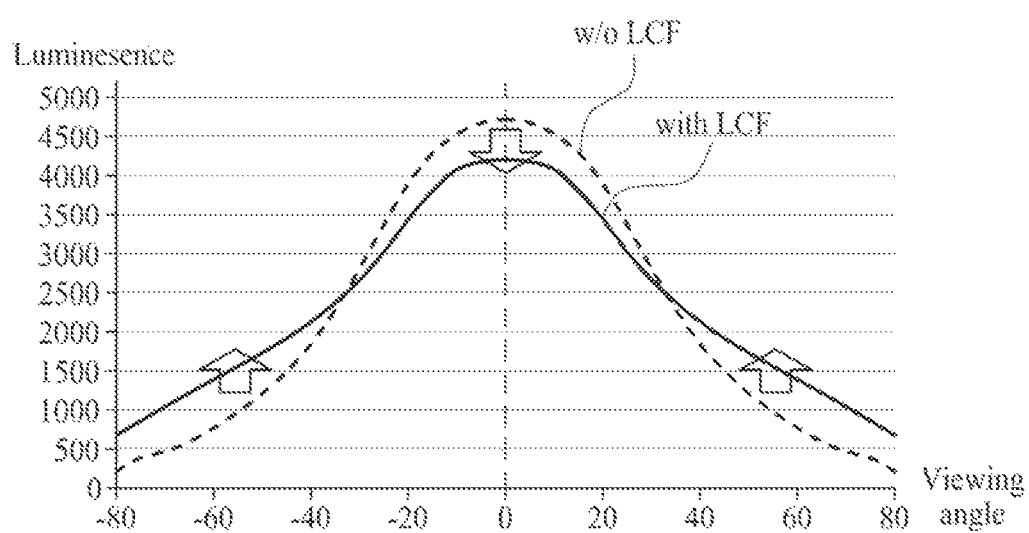
FIG. 3B is a graph showing the variations of the luminance in the viewing angle light control film according to the first embodiment of the present disclosure.

When applying the viewing angle light control film according to the present disclosure to the display apparatus, the luminance of the light radiated from the display panel can be changed as shown in FIG. 3B. FIG. 3B is a graph showing the variations of the luminance in a viewing angle light control film according to the first embodiment of the present disclosure. The dotted curve (dotted line) in FIG. 3B can represent the luminance distribution concentrated in the front viewing angle direction, for the case that the viewing angle light control film according to the present disclosure is not applied to the display panel. The solid curve (solid line) in FIG. 3B can represent the luminance distribution changed from the dotted curve, as passing through the viewing angle light control film according to the present disclosure.

As shown in FIG. 3B, the luminance distribution concentrated in the front viewing angle direction can be changed as the gentle Gaussian distribution in which the front luminance can be slightly lowered, and the luminance at the side viewing angle direction can be more increased. As the viewing angle light control film is included in the display apparatus shown in FIGS. 1, 2A and 2B, the display apparatus according to the present disclosure can provide image information with a relatively evenly distributed luminance over the wider viewing angle range than the display apparatus without the viewing angle light control film LCF.

Firstly, the case of without the viewing angle light control film LCF from the display apparatus shown in FIG. 2A will be explained. The first luminance distribution of the first flat area FA1 and the second luminance distribution of the second flat area FA2 can be the same. Further, the first flat area FA1 can have the first front viewing direction ①, and the second flat area FA2 can have the second front viewing direction ②. As the first flat area FA1 and the second flat area FA2 may not be arrayed on the same plane, the front viewing directions of them can be different from each other, as shown in FIG. 2A. Therefore, the luminance of the video image provided from the first flat area FA1 can be differently recognized from the luminance of the video image provide from the second flat area FA2, at the observing point VP. Further, the bending area BA can have the third front viewing direction ③ different from the first and the second front viewing directions ① and ②. Therefore, at the observing point VP, three different luminances of the video images can be provided so that the observer can recognize the color and/or brightness distortions. However, as including the viewing angle light control film LCF according to the first embodiment of the present disclosure, the display apparatus according to the present disclosure can have no color change or luminance difference over wide viewing directions, so no optical distortion due to the bending structure can be occurred.

Most of the display apparatus currently manufactured and provided can have a luminance distribution in which the brightness is concentrated at the front viewing direction. In addition, for the case of the display apparatus having various viewing directions, it is manufactured to have a luminance distribution in which the brightness is concentrated in the average front direction. However, by attaching the viewing angle light control film according to the first embodiment of the present disclosure, the display apparatus having various front viewing directions can provide high quality image information in which no optical distortion may occur in any viewing direction. Hereinafter, various viewing angle light control films according other embodiments will be described. The viewing angle light control films explained below can also obtain the same effects as in the first embodiment.

Second Embodiment

Figure 4:
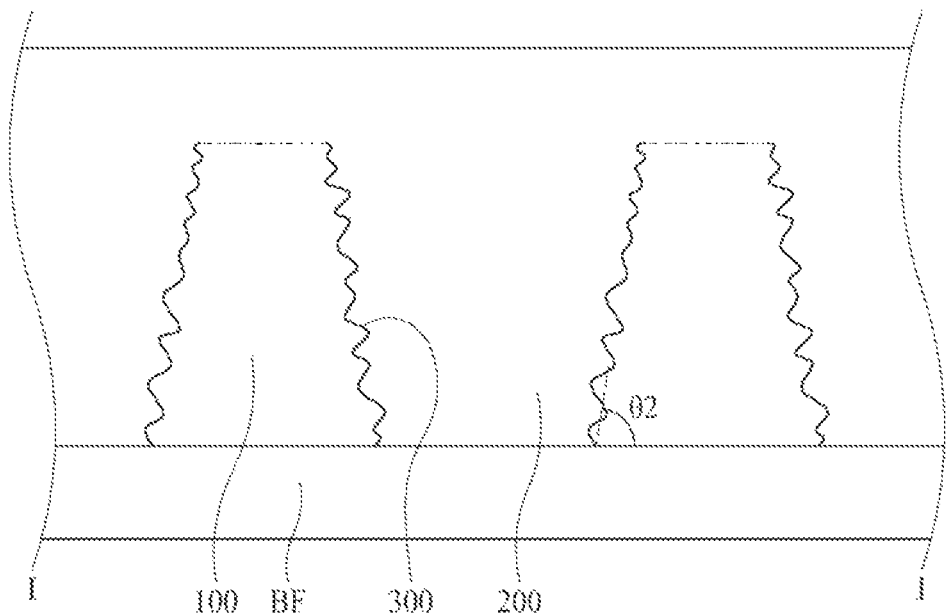
FIG. 4 is a cross-sectional view illustrating a structure of a viewing angle light control film according to a second embodiment of the present disclosure.

Hereinafter, referring to FIG. 4, the second embodiment of the present disclosure will be explained. FIG. 4 is a cross-sectional view illustrating a structure of a viewing angle light control film according to the second embodiment of the present disclosure.

The structure of a viewing angle light control film LCF according to the second embodiment of the present disclosure can be very similar with the structure of the first embodiment. The description for the same element will not be duplicated or may be briefly provided. The elements having the same drawing references not explained in this embodiment can be referred to the first embodiment.

Referring to FIG. 4, the viewing angle light control film LCF according to the second embodiment can comprise a base film BF, a first optical layer 100, a second optical layer 200 and an embossing pattern (or ragged pattern) 300. The base film BF, the first optical layer 100 and the second optical layer 200 can be same with those of the first embodiment.

The difference can be on the structure of the embossing pattern 300. Especially, comparing the embossing pattern 300 according to the second embodiment to that of the first embodiment, the slanted angle of the embossing pattern 300 to the plane surface of the base film BF can be smaller than that of the first embodiment a little. For example, the embossing pattern 300 defined by the side wall of the first optical layer 100 can have a second slanted angle $\theta 2$ of 70° at least to the base film BF. The second slanted angle $\theta 2$ can be smaller than the first slanted angle $\theta 1$. In order to prevent the luminance at the front viewing direction from being lowered too much, it is preferable that the second slanted angle $\theta 2$ can be selected one in range between 75° and 89° with respect to the plane surface of the base film BF.

The embossing pattern 300 according to the second embodiment can be slanted as to being closer to the horizontal plane (i.e., the plane surface of the base film BF) than the first embodiment. Therefore, the light incident to the side viewing direction can be diffused or scattered over wider viewing angle than the first embodiment. As a result, the luminance distribution can be a smoother Gaussian distribution graph in which the center portion can be further lowered and the side portions can be further raised than those of the solid curve in FIG. 3B.

Third Embodiment

Figure 5:
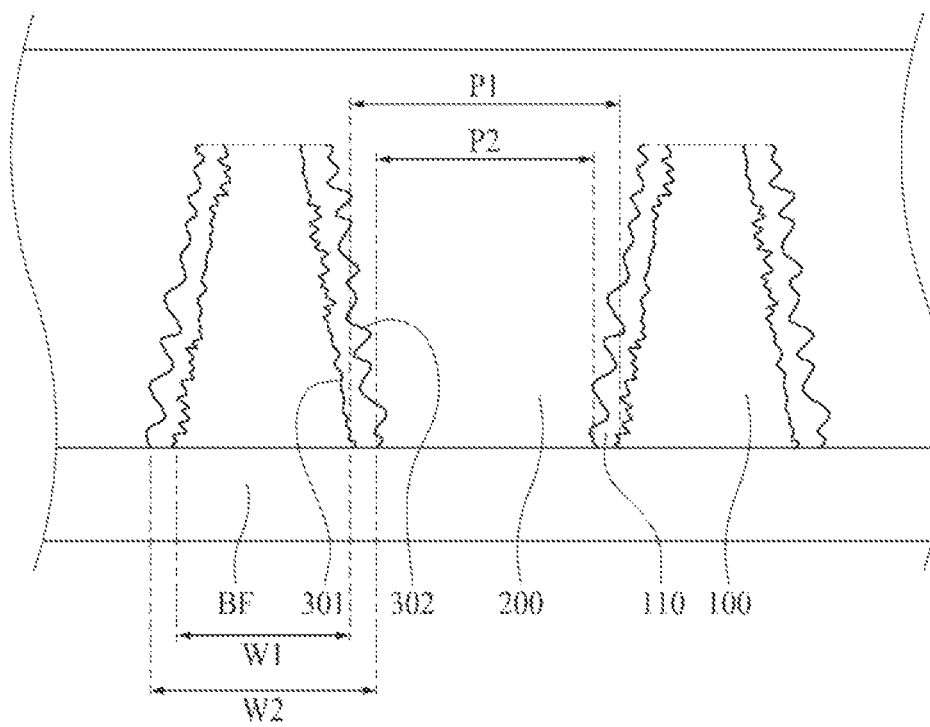
FIG. 5 is a cross-sectional view illustrating a structure of a viewing angle light control film according to a third embodiment of the present disclosure.

Referring to FIG. 5, a viewing angle light control film according to the third embodiment of the present disclosure will be explained. FIG. 5 is a cross-sectional view illustrating a structure of a viewing angle light control film according to the third embodiment of the present disclosure.

The structure of the viewing angle light control film LCF according to the third embodiment of the present disclosure can be similar with the structures of the first embodiment and/or the second embodiment. A difference is that the viewing angle light control film LCF according to the third embodiment can have two layers. The description for the same element will not be duplicated or may be briefly provided. The elements having the same drawing references not explained in this embodiment can be referred to the first embodiment.

Referring to FIG. 5, the viewing angle light control film LCF according to the third embodiment can comprise a base film BF, a first optical layer 100, a second optical layer 200, a third optical layer 110, a first embossing pattern (or ragged pattern) 301, and a second embossing pattern 302. The base film BF, the first optical layer 100, the second optical layer 200 and the third optical layer 110 can be made of transparent organic materials. The first embossing pattern 301 can be an irregular light scattering pattern formed at an interface between the first optical layer 100 and the third optical layer 110. The second embossing pattern 302 can be an irregular light scattering pattern formed at an interface between the third optical layer 110 and the second optical layer 200.

For example, by depositing the first optical material on the base film BF and patterning it, the first optical layer 100 can be formed in which a plurality of pillars having a height H and a first width W1 can be arrayed with a first intervals (or first arrangement intervals) P1. By etching the side walls of the first optical layer 100, the first embossing pattern 301 can be formed. By depositing the third optical material and patterning it, the third optical layer 110 can be formed in which a plurality of pillars having the height H and a second width W2 can cover and surround the first optical layer 100 and the first embossing pattern 301. A plurality of the third optical layers 110 can be arrayed with a second interval P2. After that, by etching the side walls of the third optical layer 110, the second embossing pattern 302 can be formed. And then, the second optical layer 200 can be formed as perfectly covering and burying the first optical layer 100 and third optical layer 110, so that the top surface of the second optical layer 200 can have a flat plane surface.

Here, it is preferable that the difference between the first width W1 and the second width W2 can be much narrower than the first width W1. As a result, the viewing angle light control film LCF can have a structure in which a plurality of third optical layer 110 having the thin film wall structure can be arrayed with the second intervals P2.

It is preferable that the first optical layer 100 and the third optical layer 110 can have different refractive indices from each other. Further, it is preferable that the third optical layer 110 and the second optical layer 200 can have different refractive indices from each other. Here, the first optical layer 100 can have the same refractive index as the second optical layer 200. However, it is not limited thereto, the first optical layer 100, the second optical layer 200 and the embossing pattern 300 can have different refractive indices from each other.

In one example, the first embossing pattern 301 and the second embossing pattern 302 can have a first slanted angle θ1 in range between 88.5° and 90° with respect to the plane surface of the base film BF, as in the first embodiment. In another example, the first embossing pattern 301 and the second embossing pattern 302 can have a second slanted angle θ2 in range between 75° and 89° with respect to the plane surface of the base film BF, as in the second embodiment. However, it is not limited thereto, the first embossing pattern 301 and the second embossing pattern 302 can have different slanted angles from each other. For example, the first embossing pattern 301 can have the first slanted angle θ1, while the second embossing pattern 302 can have the second slanted angle θ2, or vice versa.

Fourth Embodiment

Figure 6:
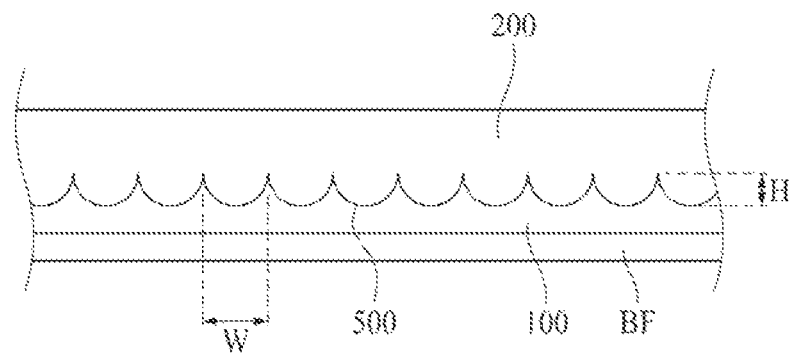
FIG. 6 is a cross sectional view illustrating a structure of the viewing angle light control film according to a fourth embodiment of the present disclosure.

Hereinafter, referring to FIG. 6, a viewing angle light control film LCF according to the fourth embodiment of the present disclosure will be explained. FIG. 6 is a cross sectional view illustrating a structure of the viewing angle light control film according to the fourth embodiment of the present disclosure.

In the first to third embodiments, the viewing angle light control film LCF for enhancing the luminance at the side viewing directions instead of lowering the luminance at the front viewing direction a little, using the embossing pattern almost vertically formed. By using different structure, the same purpose and effect can be acquired. For example, micro-lens can be applied instead of the embossing pattern to enhancing the luminance at the side viewing directions and reducing the luminance at the front viewing direction by scattering the light to the side viewing directions.

In the fourth embodiment, the viewing angle light control film LCF uses micro-lens patterns. Referring to FIG. 6, the viewing angle light control film LCF can include a base film BF, a first optical layer 100, a second optical layer 200 and a lens pattern 500. The lens pattern 500 can be defined as an interface between the first optical layer 100 and the second optical layer 200.

The base film BF can be made of a transparent material having the refractive index in range of 1.40 to 1.50. The first optical layer 100 can include a first optical material having a first refractive index equal to or slightly larger than the refractive index of the base film BF. The second optical layer 200 can include a transparent organic material having a refractive index in a range between 1.51 and 1.65. It is preferable that the first optical layer 100 can be a low refractive layer, and the second optical layer 200 can be a high refractive layer. Particularly, it is preferable that the refractive difference between the first optical layer 100 and the second optical layer 200 can be 0.10 at least. The base film BF can have the same refractive index as the first optical layer 100.

The lens pattern 500 can have a concaved shape. For example, the lens pattern 500 can have a concaved shape recessed toward the base film BF. Here, the height H of the lens pattern 500 can be corresponding to the height of the embossing pattern 300 described in the first embodiment. The width W of the lens pattern 500 can be corresponding to the width W of the embossing pattern 300 and/or the arrangement interval P. Further, the H/W, the ratio of height H to the width W, can be selected any one in range between 30% and 200%. More preferably, the ratio of H/W can be selected any one in range between 40% and 80%.

Fifth Embodiment

Figure 7:
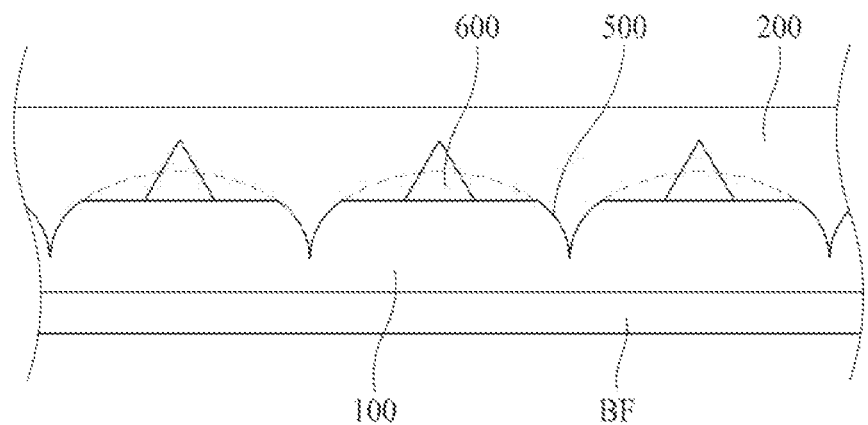
FIG. 7 is a cross sectional view illustrating a structure of the viewing angle light control film according to a fifth embodiment of the present disclosure.

Hereinafter, referring to FIG. 7, a viewing angle light control film according to the fifth embodiment of the present disclosure will be explained. FIG. 7 is a cross sectional view illustrating a structure of the viewing angle light control film according to the fifth embodiment of the present disclosure.

Referring to FIG. 7, the viewing angle light control film LCF according to the fifth embodiment of the present disclosure can comprise a base film BF, a first optical layer 100, a second optical layer 200, a lens pattern 500 and a prism pattern 600.

The base film BF can be made of a transparent material having the refractive index in range of 1.40 to 1.50. The first optical layer 100 can include a first optical material having a first refractive index equal to or slightly larger than the refractive index of the base film BF. The second optical layer 200 can include a transparent organic material having a refractive index in a range between 1.51 and 1.65. It is preferable that the first optical layer 100 can be a low refractive layer, and the second optical layer 200 can be a high refractive layer. Particularly, it is preferable that the refractive difference between the first optical layer 100 and the second optical layer 200 can be 0.10 at least. The base film BF can have the same refractive index as the first optical layer 100. However, it is not limited thereto, the first optical layer 100 can be a high refractive layer and the second optical layer 200 can be a low refractive layer.

The lens pattern 500 can have a convexed shape. For example, the lens pattern 500 can have a convexed shape upsurged from the base film BF. In particular, the middle portion of the lens pattern 500 can be a plane surface. For example, the middle portion of the lens pattern 500 can be a flat plane surface and the circumferences surrounding the middle portion can form the convexed lens shape.

The middle portion of the lens pattern 500 can be a portion in which light incident obliquely from the outside of the base film BF can be reflected back due to the total reflection condition when the middle portion has the convexed lens shape. In order to minimize the loss amount of the light by the total reflection, by calculating the effective area to the incident angle of the incident light, it is preferable that the middle portion excepting the effective area can be made in a flat plane surface. As the calculation for the effective area to the incident angle is well known in the optical technology, the detailed explanation is omitted.

In addition, a prism pattern 600 can be disposed at the central area of the flat middle portion of the lens pattern 500. The prism pattern 600 can diffuse the light incident through the flat middle portion into the side directions. For example, when there is no prism pattern 600, the luminance at the front viewing direction may not be lowered so much, and the sufficient diffusion effect may not be obtained only with the convex lens pattern 500 at the circumferences. In order to diffuse the light incident in front viewing direction to the side directions, it is preferable that the prism pattern 600 can be disposed on the central flat plane surface at the middle portion of the lens pattern 500. The prism pattern 600 may not be a necessary element. It is preferable that the prism pattern 600 can be disposed on the lens pattern 500 when it is necessary to diffuse the light to the side directions.

It is preferable that the base surface of the prism pattern 600 can be disposed on the flat plane surface of the lens pattern 500, and the apex point of the prism pattern 600 can face to upward. In order to prevent the luminance at the front viewing direction from being lowered not so much, it is preferable that the base surface of the prism pattern 60 can have smaller area than the flat plane surface of the lens pattern 500. For example, the base surface of the prism pattern 60 can have the area between ⅓ and ⅔ of the area of the flat plane surface of the lens pattern 500. In addition, the prism pattern 600 can be formed of a transparent material having a refractive index same as the refractive index of the first optical layer 100.

Sixth Embodiment

In the embodiments described so far, the cross-sectional structure of the viewing angle light control film LCF has been described. Hereinafter, referring to FIG. 8, the arrangement structure of the embossing pattern and the lens pattern provide in the viewing angle light control film LCF according to the above-mentioned embodiments, on a plane view, will be explained. The viewing angle light control film LCF according to the present disclosure can be attached on the front surface of the display panel DIP as shown in FIGS. 2A and 2B. Therefore, the description hereinafter can be explained further referring to FIGS. 2A and 2B.

Figure 8:
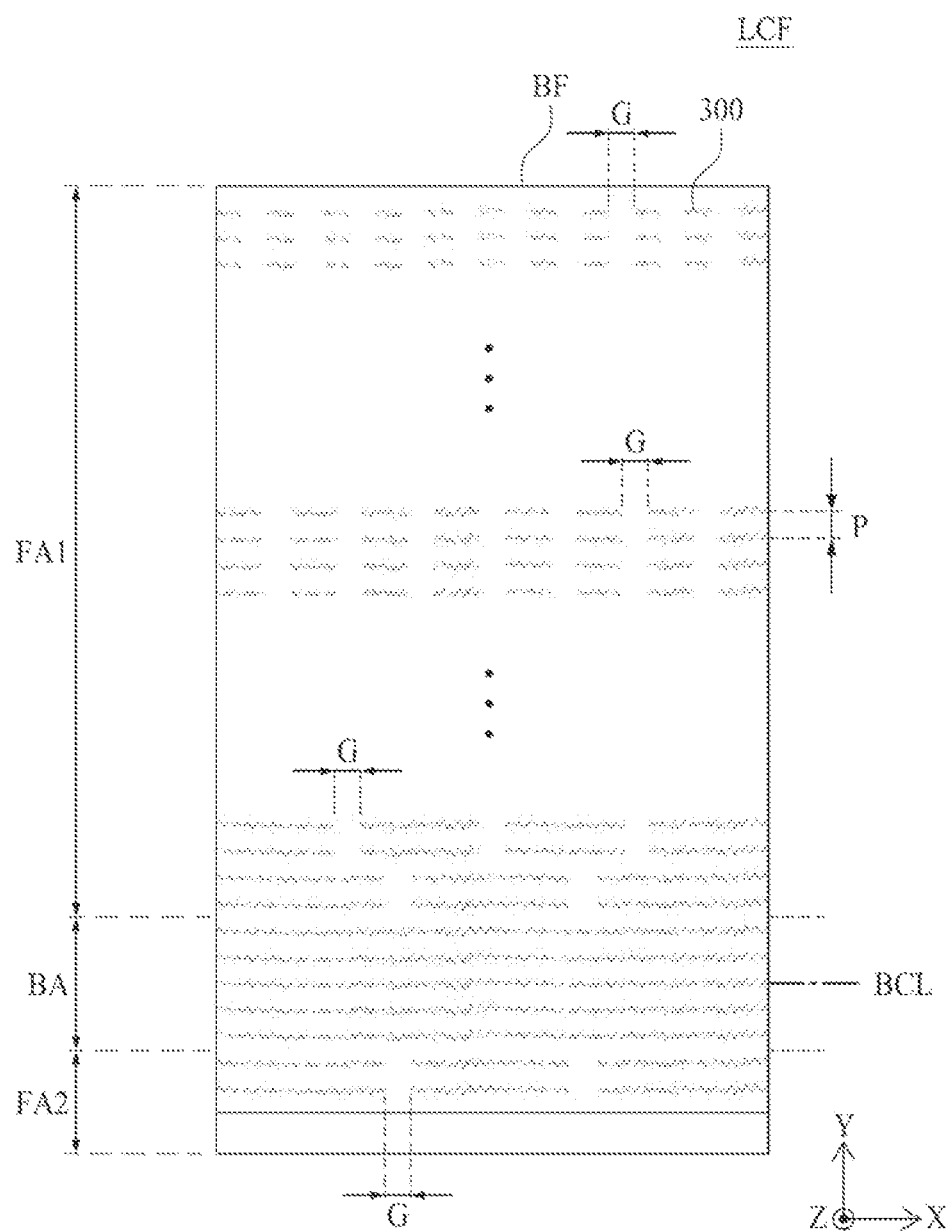
FIG. 8 is a plane view illustrating a structure of the viewing angle light control film according to an example of the present disclosure.

FIG. 8 is a plane view illustrating a structure of the viewing angle light control film according to the present disclosure. The following description can be explained with the first embodiment, but it is not limited thereto. The following description can be applied to other embodiments.

Referring to FIG. 8, the viewing angle light control film LCF according to the present disclosure can include a plurality of embossing patterns 300 arrayed along the horizontal direction of the display panel DIP. For example, the embossing pattern 300 can be arrayed in a horizontal direction (X-axis) and is disposed at regular intervals in a vertical direction (Y-axis). Here, the regular interval can be corresponding to the arrangement interval P.

The embossing pattern 300 can have a pattern continuously extended along the horizontal direction on the base film BF of the viewing angle light control film LCF, or can have a pattern in which a plurality of line segment shapes is discontinuously arranged. For example, the continuous pattern can be defined that the embossing pattern 300 can be formed as continuously extended from the left end side to the right end side on the base film BF. On the contrary, the discontinuous pattern can be defined that a plurality of the segmented embossing patterns 300 can be arrayed with a separation gap G.

The discontinuous pattern has a plurality of separation gap (or pattern gap) G having the transparent optical material without scattering function between the embossing pattern 300, so that it can be a portion providing without lowering the luminance in the front viewing direction. It is preferable that the discontinuous pattern can be disposed where the scattering angle of the front luminance on the Y-axis needs to be narrowed.

The bending area BA can be a part in which the front viewing direction is changed from the first flat area FA1, so it can be necessary to increase the degree of scattering the front luminance to the side viewing directions. Therefore, it is preferable that the embossing pattern 300 can be arrayed as being the continuous pattern.

In addition, in order for the luminance distribution to be smoothly changed along the Y-axis direction of the viewing angle light control film LCF, the degree of the discontinuity of the embossing pattern 300 (i.e., the portion (or number) of separation gap G in one line of the embossing pattern 300) can be increased sequentially as the distance from the bending area BA increases.

For example, at the topmost side of the viewing angle light control film LCF, the ratio of the length on X-axis of the embossing pattern 300 and the separation gap G can be 1:1. In the first flat area FA1, i.e., the area between the topmost side to the bending area BA, the embossing pattern 300 can be arrayed as the length on X-axis of the embossing pattern 300 getting progressively or gradually longer. In the bending area BA or in an area closest to the bending area BA, the embossing pattern 300 can be arrayed as being the continuously extended. For an example, In the second flat area FA2, the embossing pattern 300 can have the continuous pattern as in the bending area BA. For another example such as the second flat area FA2 can have relatively large area, in the second flat area FA2, the embossing pattern 300 can be arrayed to be mirror-symmetric with the embossing pattern 300 arrayed in the first flat area FA1 with respect to the bending area BA.

As explained in FIGS. 2A and 2B, the second flat area FA2 can have the second viewing direction different from the first flat area FA1, so the second flat area FA2 can have the color distortion or luminance distortion. By applying the viewing angle light control film LCF according to the present disclosure to the display panel, the color difference or the luminance difference between the first flat area FA1 and the second flat area FA2 can be remarkably reduced. However, the bending area BA is the boundary area where the viewing direction is changed, so the color and the luminance can be recognized severely. Therefore, it is preferable that the embossing pattern 300 can be arrayed as the continuous pattern in the bending area BA, and the embossing pattern 300 can be arrayed as the discontinuous pattern in the first and second flat areas FA1 and FA2.

For another example, in the bending area BA, the embossing pattern 300 can be arrayed as the continuous pattern at the area near the bending central line BCL, and the embossing pattern 300 can be arrayed such that the discontinuity can be gradually increased as being closer to the first and second flat areas FA1 and FA2 from the bending central line BCL.

The arrangement interval P on the Y-axis of the embossing pattern 300 can be gradually narrowed or broadened. For example, in the bending area BA, the arrangement interval P of the embossing pattern 300 can be narrowest, and the embossing pattern 300 can be arrayed such that the arrangement interval P can be gradually broadened as being closer to the first and second flat areas FA1 and FA2 from the bending central line BCL.

As the embossing pattern 300 can be the pattern for scattering the luminance of the front direction to the side directions, it is preferable the density of the embossing pattern 300 in the bending area BA can be higher than other areas in order to enhance the diffusing or scattering effect to the front luminance. On the contrary, it is preferable that the density of the embossing pattern 300 can be lower where there is no severe difference in the front luminances.

For example, the embossing pattern 300 can include a plurality of pattern segments arrayed in one line. The distribution density of the segments can be getting higher as the pattern gap G can be getting shorter than the pattern length of the segment. The distribution density of the segments can be getting lower as the pattern gap G can be getting longer than the pattern length of the segment.

FIG. 8 shows a viewing angle light control film applied to the display panel having the portrait shape in which the vertical side along the Y-axis is longer than the lateral side along the X-axis. In this case, some portion of the display panel in the Y-axis can be bent to +Z direction. However, it is not limited thereto, the viewing angle light control film can be applied to the display panel having the landscape shape in which the lateral side along the X-axis is longer than the vertical side along the Y-axis. In that case, the display panel can have a structure in which some portion of the display panel in the X-axis can be bent to +Z direction, suitable for the driver's seat of a car or the cockpit of an airplane.

In the portrait type, the optical distortion often can occur in the viewing direction of the Y-axis. Therefore, it is preferable that the longitudinal direction of the light scattering pattern formed on the viewing angle light control film can be aligned in the X-axis direction. On the contrary, in the landscape type, the optical distortion often can occur in the viewing direction of the X-axis. In that case, it is preferable that the longitudinal direction of the light scattering pattern formed on the viewing angle light control film can be aligned in the Y-axis direction.

First Applicable Example

Until now, the viewing angle light control film LCF according to the present disclosure has been described. Hereinafter, a structure of a display apparatus applied the viewing angle light control film LCF to the display panel will be explained.

Figure 9:
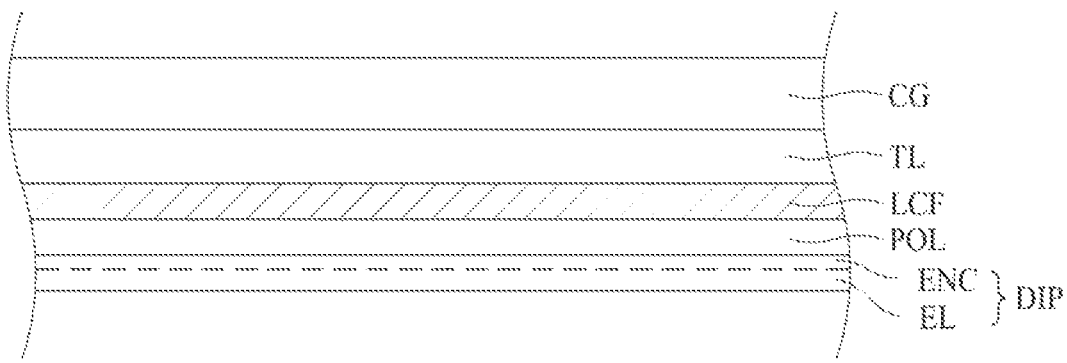
FIG. 9 is a cross-sectional view illustrating a structure of a display apparatus having a viewing angle light control film according to a first applicable example of the present disclosure.

Referring to FIG. 9, the first applicable example of the present disclosure will be explained. FIG. 9 is a cross-sectional view illustrating a structure of a display apparatus having a viewing angle light control film according to the first applicable example of the present disclosure. In FIGS. 2A and 2B, the display apparatus according to the present disclosure can have a structure including simply the viewing angle light control film and the display panel. Hereinafter, more detailed structure of the display apparatus will be explained.

The display apparatus according to the first applicable example of the present disclosure can comprise a display panel DIP, an optical film POL, a viewing angle light control film LCF, a touch layer TL and a cover plate CG. The display panel DIP can be a flat display panel having a curved structure in which whole display panel is smoothly curved or an edge bending structure in which edge portions are bend or folded. For example, an organic light emitting display panel can be used. For the organic light emitting diode display panel, the display panel DIP can include an emission layer EL and an encapsulation layer ENC covering the emission layer EL.

The optical film POL can be an optical element attached on the display panel DIP for preventing the reflection of the light incident from outside. For example, the optical film POL can include a circular polarization film.

The viewing angle light control film LCF can be attached on the optical film POL. The viewing angle light control film LCF can have a structure selected from any one explained in the first to sixth embodiments.

The touch layer TL can be attached on the viewing angle light control film LCF. The touch layer TL can be the capacitive touch sensor type or a resistive touch sensor type. For the capacitive touch sensor type touch layer TL can be a self-capacitive type or a mutual-capacitive type. For the self-capacitive type, the touch layer TL can include a first electrode layer, a second electrode layer and an insulation layer between the first electrode layer and the second electrode layer. For the mutual-capacitive type, the touch layer TL can include a first electrode and a second electrode separately disposed on the same layer, an insulating layer covering the first and second electrodes, and a connection line on the insulating layer for connecting the first electrode or the second electrode.

The cover plate CG can be attached on the touch layer TL as being the topmost layer of the display apparatus. The cover plate CG can be an element having a high strength material for protecting the elements disposed thereunder. For the case that the display panel DIP can be freely bent, the cover plate CG can be made of a film material having excellent flexibility. For the case that the display panel DIP is manufactured in a shape that is bent only at a specific angle, the cover plate CG can be made of a material having excellent rigidity, such as a glass, can be formed as corresponding to the shape of the display panel DIP, and then can be combined with the display panel DIP.

The display apparatus according to the first applicable example can have a structure in which the viewing angle light control film LCF can be disposed between the cover plate CG and the display panel DIP. Especially, the viewing angle light control film LCF can be stacked on the optical film POL.

Second Applicable Example

Figure 10:
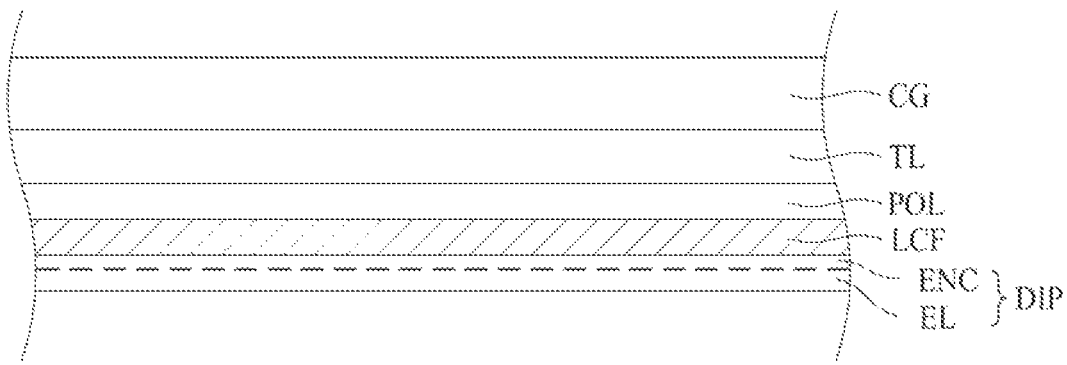
FIG. 10 is a cross-sectional view illustrating a structure of a display apparatus having a viewing angle light control film according to a second applicable example of the present disclosure.

Next, referring to FIG. 10, a display apparatus according to the second applicable example of the present disclosure will be explained. FIG. 10 is a cross-sectional view illustrating a structure of a display apparatus having a viewing angle light control film according to the second applicable example of the present disclosure. The display apparatus according to the second applicable example can have a similar structure with the first applicable example. Therefore, the same elements with the first applicable example may not be repeated. When required, the first applicable example can be referred.

The display apparatus according to the second applicable example of the present disclosure can comprise a display panel DIP, an optical film POL, a viewing angle light control film LCF, a touch layer TL and a cover plate CG. In the second applicable example, the viewing angle light control film LCF can be disposed between the optical film POL and the display panel DIP. In this case, the viewing angle light control film LCF can be attached on the encapsulation layer ENC of the display panel DIP. The optical film POL can be stacked on the viewing angle light control film LCF.

The viewing angle light control film LCF and the optical film POL can be made as a single film. For example, the circular polarization film can include a base film and a polarization element on the base film. In this case, the viewing angle light control film LCF can be used as the base film and the polarization element can be formed or bonded on the viewing angle light control film LCF. As a result, a composite optical film having the external light reflection prevention function and the viewing angle light control function.

Third Applicable Example

Figure 11:
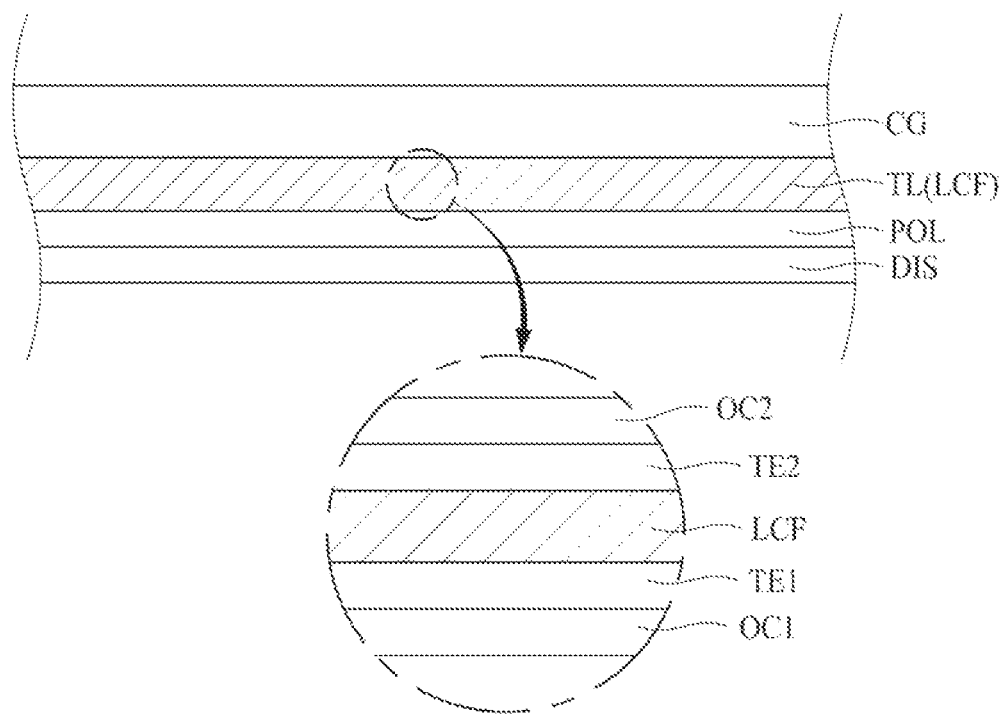
FIG. 11 is a cross-sectional view illustrating a structure of a display apparatus having a viewing angle light control film according to a third applicable example of the present disclosure.

Hereinafter, referring to FIG. 11, a display apparatus according to the third applicable example of the present disclosure will be explained. FIG. 11 is a cross-sectional view illustrating a structure of a display apparatus having a viewing angle light control film according to the third applicable example of the present disclosure. The display apparatus according to the third applicable example can have a similar structure with the first applicable example. Therefore, the same elements with the first applicable example may not be repeated. When required, the first applicable example can be referred.

The display apparatus according to the third applicable example of the present disclosure can comprise a display panel DIP, an optical film POL, a touch layer TL and a cover plate CG. Here, the touch layer TL can be embedded with a viewing angle light control film LCF.

The touch layer TL can have a structure in which touch electrode layers are stacked on a transparent film. Here, the viewing angle light control film LCF can be used as the transparent film of the touch layer TL.

A circled portion shown in FIG. 1 is an enlarged view illustrating an example of the touch layer TL according to the third applicable example. The touch layer TL according to the third applicable example can have a structure of a self-capacitance type.

For example, the touch layer TL according to the third applicable example can include a viewing angle light control film LCF and a first electrode layer TE1 on the bottom surface of the viewing angle light control film LCF. Further, a first overcoat layer OC1 can be disposed on the first electrode layer TEL The first overcoat layer OC1 can be an insulating layer for protecting the first electrode layer TE1 electrically and physically.

A second electrode layer TE2 can be further stacked on the top surface of the viewing angle light control film LCF. A second overcoat layer OC2 can be disposed on the second electrode layer TE2. The second overcoat layer OC2 can be an insulating layer for protecting the second electrode layer TE2 electrically and physically.

On the top surface of the viewing angle light control film LCF, a first electrode layer, a second electrode layer and an overcoat layer can be sequentially stacked. In this case, the bottom surface of the viewing angle light control film LCF can be attached to the optical film POL or to the encapsulation layer ENC of the display panel DIP. The viewing angle light control film LCF can have any one structure explained in the first to sixth embodiments.

Features, structures, effects and so on described in the above described examples of the present disclosure are included in at least one example of the present disclosure, and are not necessarily limited to only one example. Furthermore, features, structures, effects and so on exemplified in at least one example of the present disclosure can be implemented by combining or modifying other examples by a person having ordinary skilled in this field. Therefore, contents related to such combinations and modifications should be interpreted as being included in the scope of the present application.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A viewing angle light control film comprising:
   a base film;
   a first optical layer on the base film;
   a second optical layer contacting the first optical layer; and
   a light scattering pattern disposed at an interface between the first optical layer and the second optical layer,
   wherein the first optical layer has a plurality of pillars, each pillar having a first width and a first height, and the plurality of pillars are arrayed with an arrangement interval corresponding to the first width,
   wherein the light scattering pattern is provided on sidewalls of the plurality of pillars, and
   wherein the second optical layer is filled in the arrangement interval between the plurality of pillars of the first optical layer.

2. The viewing angle light control film according to claim 1, further comprising:
   a third optical layer covering the plurality of pillars of the first optical layer and having a second width wider than the first width,
   wherein the light scattering pattern includes:
   a first embossing pattern provided at the sidewalls of the plurality of pillars; and
   a second embossing pattern provided at sidewalls of the third optical layer.

3. The viewing angle light control film according to claim 1, wherein the light scattering pattern has a slanted angle in a range between approximately 75° and 89° with respect to a plane surface of the base film.

4. The viewing angle light control film according to claim 1, further comprising a lens pattern having a concaved lens pattern recessed toward the base film.

5. The viewing angle light control film according to claim 1, further comprising a lens pattern having a convexed lens pattern uprised from the base film,
   wherein a middle area of the convexed lens pattern has a flat plane surface, and
   wherein a prism pattern is disposed on the flat plane surface.

6. The viewing angle light control film according to claim 1, wherein the base film and the first optical layer have a first refractive index in a range between approximately 1.40 and 1.50, and
   wherein the second optical layer has a second refractive index in a range between approximately 1.51 and 1.65.

7. A display apparatus comprising:
   a display panel; and
   a viewing angle light control film including:
   a base film;
   a first optical layer on the base film;
   a second optical layer contacting the first optical layer; and
   a light scattering pattern disposed at an interface between the first optical layer and the second optical layer,
   wherein the light scattering pattern includes a lens pattern provided between the first optical layer and the second optical layer.

8. A display apparatus comprising:
   a display panel including:

a first display area having a first front viewing direction; and a second display area being continuous from the first display area and having a second front viewing direction different from the first front viewing direction; and a viewing angle light control film disposed at a front face of the display panel and including:

a base film having a first area corresponding to the first display area, and a second area corresponding to the second display area;

a first optical layer on the base film;

a second optical layer contacting the first optical layer; and a light scattering pattern disposed at an interface between the first optical layer and the second optical layer, wherein the first optical layer and the second optical layer have a refractive index difference of at least approximately 0.10.

9. The display apparatus according to claim 8, wherein the display panel and the viewing angle light control film are disposed on a plane including a first axis and a second axis perpendicular to the first axis, wherein the light scattering pattern includes a pattern length extended along to the first axis, and wherein the light scattering pattern is arrayed along the second axis with an arrangement interval.

10. The display apparatus according to claim 9, wherein the light scattering pattern is disposed as having a maximum distribution density at a boundary between the first area and the second area, and wherein the light scattering pattern, in the first area and the second area, is disposed as a distribution density is gradually decreased as being apart from the boundary.

11. The display apparatus according to claim 10, wherein the light scattering pattern is arrayed continuously along the first axis at the boundary, and wherein the light scattering pattern has a structure in which a plurality segments are arrayed along the first axis in the first area and the second area, each segment having the pattern length and arrayed with a pattern gap.

12. The display apparatus according to claim 11, wherein the distribution density of the plurality of segments is getting higher as the pattern gap is getting shorter than the pattern length of each segment, and wherein the distribution density of the plurality of segments is getting lower as the pattern gap is getting longer than the pattern length each segment.

13. The display apparatus according to claim 8, further comprising:

an optical film disposed on the display panel;

a touch layer disposed on the optical film; and a cover plate disposed on the touch layer, wherein the display panel includes an emission layer and an encapsulation layer covering the emission layer.

14. The display apparatus according to claim 13, wherein the viewing angle light control film is disposed between the encapsulation layer and the optical film and/or between the optical film and the touch layer.

15. The display apparatus according to claim 13, wherein the touch layer includes:

the viewing angle light control film;

a touch electrode layer disposed on a top surface and/or a bottom surface of the viewing angle light control film; and an overcoating layer covering the touch electrode layer.

* * * * *